United States Patent [19]
Rowe et al.

[11] Patent Number: 5,316,203
[45] Date of Patent: May 31, 1994

[54] ENCAPSULATED STOP-OFF COATING FOR DIFFUSION BONDING

[75] Inventors: Raymond G. Rowe, Schenectady, N.Y.; Gary T. Martini, Loveland, Ohio; Lawrence J. Galaske, Jr., Mason, Ohio; Douglas J. White, Cincinnati, Ohio; Mark A. Robinson, Covington, Ky.

[73] Assignee: General Electric Company, Schenectady, N.Y.

[21] Appl. No.: 52,972

[22] Filed: Apr. 27, 1993

[51] Int. Cl.$^5$ .............................. B23K 20/18
[52] U.S. Cl. ................... 228/118; 156/305; 427/203
[58] Field of Search ............ 228/118; 156/280, 305; 427/203

[56] References Cited

U.S. PATENT DOCUMENTS

| | | | |
|---|---|---|---|
| 3,722,071 | 3/1973 | Van Orsdel | 427/203 X |
| 4,220,276 | 9/1980 | Weisert et al. | 228/118 |
| 4,269,053 | 5/1981 | Agrawal et al. | 72/42 |
| 4,353,623 | 10/1982 | Maier | 156/305 X |
| 4,549,685 | 10/1985 | Paez | 228/118 |

FOREIGN PATENT DOCUMENTS

0266073 2/1987 European Pat. Off.

*Primary Examiner*—Kenneth J. Ramsey
*Attorney, Agent, or Firm*—James Magee, Jr.

[57] ABSTRACT

An improved method for superplastic forming diffusion bonding includes application of a protective encapsulating coating over the stop-off coating to prevent migration of yttria into regions to be diffusion bond.

2 Claims, No Drawings

ENCAPSULATED STOP-OFF COATING FOR DIFFUSION BONDING

This invention relates to fabrication of metal structures by superplastic forming and diffusion bonding and more particularly to a fabrication process in which the use of an encapsulated stop-off material for application to areas where bonding is to be avoided.

Production methods, for the fabrication of structures in which metal blanks, preferably of a titanium alloy, are joined at selected areas by diffusion bonding at elevated temperatures and pressures and then subjected to superplastic expansion to form a desired structure, are well known and are used particularly in the aircraft industry where complicated high strength light weight structures are required. In the known methods, the metal blanks are first treated at selected areas with a stop-off material, such as yttria, boron nitride, graphite, or alumina, to prevent bonding at those areas during the diffusion bonding process. During super plastic forming the metal blanks are expanded at the treated (unbonded) areas into contact with shaping moulds by means of high pressure inert gas to form an expanded structure of the desired shape. The formed structure may be of a honeycomb sandwich form or an integrally stiffened structure.

Bonding occurs where no stop-off coating is present and does not occur where the coating is applied.

The stop-off coating sometimes referred to as a resist coating, is applied to the metal surface by known methods such as brushing, dipping, spray coating, or silk screen printing techniques.

Numerous stop-off compositions are known and vary somewhat depending on the alloy to be used to form the parts or structures. In general, stop-off coatings comprise particles of an inert oxide such as yttria, a binder such as an acrylic resin, and a solvent such as toluene or butyl acetate. The method of using the material includes applying the stop-off in a pattern to those areas to remain unbonded or applying the coating to an entire sheet of bondable metal and selectively removing or stripping away the coating from the areas to be bonded.

The green or uncured coating must be dried then vacuum baked to remove solvent and most of the binder and to cure the resin.

Current techniques of applying and baking out the stop-off coating often results in flaking of the baked coating. This causes contamination in the areas to be diffusion bonded. Such contamination produces bonded areas having low strength due to incomplete diffusion bonding.

Previous attempts to reduce such contamination have focussed on modification of the stop-off composition, particle size, or binder content. However, there are limitations on the amount of binder which can be used to increase post bakeout strength of the coating. Too much binder tends to diminish good cured or fired strength of the coating, yet a high binder content is desired at the surface of the coating to give the stop-off coating strength and resistance to flaking.

Stop-off contamination of bonded areas is particularly troublesome in processing of large flexible components and structures.

It is an object of this invention to provide an improved method for superplastic forming and diffusion bonding.

Another object of the invention is to provide a procedure for producing diffusion bonded structures having improved continuous diffusion bonded Another object of the invention is to prevent stop-off contamination of bondable areas by unwanted stop-off material.

These and other objects of the invention are achieved by providing a relatively high concentration of binder at the surface of the stop-off coating, thereby substantially preventing stop-off contamination of areas to be bonded by encapsulating the stop-off coating with a powder free protective seal coating of a compatible binder.

The encapsulating seal coating is a means of increasing the binder content of the coating only at the surface which improves its strength and prevents the dislodging of stop-off oxide particles.

In general, the protective coating comprises a binder and solvent compatible with the binder-solvent system used to formulate the oxide powder containing stop-off coating material.

The stop-off coating is applied in the usual way and allowed to dry. The encapsulation coating is then applied by brushing or spraying and the usual bake out is carried out to remove solvent and cure the resin binder. The parts are then formed and bonded in the usual manner, e.g., by hot isostatic pressing.

Illustrative formulations for stop-off compositions and encapsulating compositions are shown in Table 1, below.

TABLE 1

| Formula | Wt. % $Y_2O_3$ | Wt. % Acrylic Binder* Solids | Wt. % Acrylic Binder* Solids | Wt. % Solvent | Solvent |
| --- | --- | --- | --- | --- | --- |
| A | 24.6 | 1.2 | 0.5 | 73.7 | Toluene |
| B | 52.8 | 5.9 | 0.0 | 45.5 | Butyl Acetate |
| C | 0.0 | 11.0 | 0.0 | 89.0 | Butyl Acetate |

*Elvacite ® ethyl methacrylate resin, DuPont etc.

Choice of resin solids and solvent is based on method of application, e.g., brushing, printing or air brushing; however both A and B can be applied by either means.

An encapsulation coating such as formula C of Table 1, having the same binder composition as formula A but no yttria when air brushed over a layer of formula A provides a composite 2-layer stop-off coating unlike any coatings previously used for superplastic formation diffusion bonding processing.

A titanium alloy manifold sheet was patterned coated with stop-off formula B at a density of about 0.02–0.05 grams per square inch. The coating was dried and overcoated with formula C by air brushing.

The coated sheets were baked in vacuum at 500° F. The sheet was sealed to a top sheet of the same alloy by arc welding and consolidated by hot isostatic press to bond the uncoated areas of sheets. A scanning ultrasonic microscope image of the consolidated panel showed no evidence of yttria particle contamination in the bonded areas. Diffusion bonded areas did not show ultrasonic reflections and are characterized as metallurgically continuous. Optical micrographs of the bond line of the diffusion-bonded region for the encapsulated test price show no evidence of yttria particle contamination and no evidence of metallurgical discontinuity even in the region adjacent the stop-off coated areas.

What is claimed is:

1. A method for fabrication of metal structures from metal sheets by superplastic forming diffusion bonding which comprises application of an adherent stop-off coating to those regions of the sheets which are not to be bonded, applying a protective encapsulating coating over the stop-off coating.

2. The method of claim 1 wherein the encapsulating coating is an acrylic resin.

* * * * *